US009384395B2

(12) United States Patent
Ryu

(10) Patent No.: US 9,384,395 B2
(45) Date of Patent: Jul. 5, 2016

(54) METHOD FOR PROVIDING AUGMENTED REALITY, AND USER TERMINAL AND ACCESS POINT USING THE SAME

(71) Applicant: Electronics and Telecommunications Research Institute, Daejeon (KR)

(72) Inventor: Cheol Ryu, Daejeon (KR)

(73) Assignee: ELECTRONIC AND TELECOMMUNICATIONS RESEARCH INSTITUTE, Daejeon (KR)

( * ) Notice: Subject to any disclaimer, the term of this patent is extended or adjusted under 35 U.S.C. 154(b) by 171 days.

(21) Appl. No.: 14/030,027

(22) Filed: Sep. 18, 2013

(65) Prior Publication Data

US 2014/0112265 A1 Apr. 24, 2014

(30) Foreign Application Priority Data

Oct. 19, 2012 (KR) ........................ 10-2012-0116599

(51) Int. Cl.
| H04L 12/16 | (2006.01) |
| G06K 9/00 | (2006.01) |
| H04M 1/00 | (2006.01) |
| H04N 5/00 | (2011.01) |
| H04L 29/06 | (2006.01) |
| H04W 4/00 | (2009.01) |

(52) U.S. Cl.
CPC ............ *G06K 9/00536* (2013.01); *H04L 67/38* (2013.01); *H04M 1/00* (2013.01); *H04N 5/00* (2013.01); *A63F 2300/1093* (2013.01); *A63F 2300/203* (2013.01); *A63F 2300/308* (2013.01); *A63F 2300/6045* (2013.01); *A63F 2300/69* (2013.01); *A63F 2300/8082* (2013.01); *H04W 4/00* (2013.01)

(58) Field of Classification Search
CPC ....... H04W 4/003; H04W 4/02; H04W 4/025; H04W 4/06; H04W 4/12; H04W 4/18; H04W 4/20; H04W 4/206
See application file for complete search history.

(56) References Cited

U.S. PATENT DOCUMENTS

| 8,131,118 | B1 * | 3/2012 | Jing et al. ...................... 382/305 |
| 2012/0001724 | A1 * | 1/2012 | Belimpasakis ................ 340/5.1 |
| 2012/0016966 | A1 * | 1/2012 | Jodlauk et al. ................ 709/219 |
| 2012/0147041 | A1 | 6/2012 | Jang |
| 2012/0229657 | A1 * | 9/2012 | Calman et al. ............. 348/207.1 |
| 2013/0159869 | A1 * | 6/2013 | Faraji ............................ 715/738 |
| 2013/0286048 | A1 * | 10/2013 | Sternitzke ..................... 345/633 |
| 2014/0293045 | A1 * | 10/2014 | Horovitz et al. .............. 348/135 |
| 2015/0046291 | A1 * | 2/2015 | Archambault ............. 705/26.63 |

FOREIGN PATENT DOCUMENTS

| EP | 2 280 563 | 2/2011 |
| KR | 10-2012-0066268 | 6/2012 |

* cited by examiner

*Primary Examiner* — Alvin Zhu
(74) *Attorney, Agent, or Firm* — Kile Park Reed & Houtteman PLLC

(57) ABSTRACT

Provided are a method for providing augmented reality (AR) services, and a user terminal and an access point using the same. The user terminal according to an embodiment of the present invention includes a reception unit that receives AR-related information broadcast by at least one access point (AP), a photographing unit that photographs an image of an object to obtain the photographed image, and a comparison unit that compares the obtained image of the object with the AR-related information received from the at least one AP to identify the object.

15 Claims, 7 Drawing Sheets

METHOD FOR PROVIDING AUGMENTED REALITY, AND USER TERMINAL AND ACCESS POINT USING THE SAME

CLAIM FOR PRIORITY

This application claims priority to Korean Patent Application No. 2012-0116599 filed on Oct. 19, 2012 in the Korean Intellectual Property Office (KIPO), the entire contents of which are hereby incorporated by reference.

BACKGROUND

1. Technical Field

Example embodiments of the present invention relate in general to augmented reality services, and more specifically, to a method for providing augmented reality services and a user terminal and access point using the same.

2. Related Art

In recent years, the use of a smart phone that combines the advantages of a mobile phone and a personal digital assistant (PDA) has been increasing. The smart phone combines a basic mobile phone function and a data communication function to provide a variety of application programs such as games, e-mails, wake-up calls, MP3, scheduling, a digital camera, multimedia messaging, wireless Internet services, and the like.

The rapid spread of such a smart phone has accelerated commercialization of augmented reality (AR). AR technology complements the real world with the virtual world to provide a virtual environment created using computer graphics that contains additional information about the real environment, which is the main environment.

AR technology augments the real world viewed through the eyes of a user with additional information about the real world by combining the viewed real world with a virtual world and showing the result as an image. A closely related concept is mixed reality (MR).

In the past, as a method for receiving information about peripheral devices or peripheral objects for AR services, a method of using a centralized database of a previously established specific server has been used.

That is, a user desiring to receive the AR services may send, to an AR service provider, a service request including information such as his or her position or viewing direction. The AR service provider may compare position or viewing direction information of a service user with information of objects stored in the database, and transmit matching information to a service user terminal. In an AR application that has acquired the transmitted matching information, AR services may be provided in such a manner that additional information, in addition to images of peripheral objects, is visually displayed on a screen viewed by a user. Accordingly, users desiring to use existing AR services should be able to access the Internet using a mobile communication network (for example, 3G data communication or LTE data communication) or a wireless local area network (WLAN).

In addition, in this process, AR users should transmit privacy-related information such as their positions or viewing directions to the AR service provider. That is, there are disadvantages regarding Internet access and privacy protection.

In addition, in order to provide services through the centralized database, a large number of pieces of information about objects (for example, a store's name, information about services or articles being sold, and the like) have to be collected, and an advertiser may generally provide this information together with positions associated with the services.

However, when the information becomes inaccurate or obsolete for any of various reasons, post-processing to delete the inaccurate or obsolete information or update information about state changes is required.

However, when the advertiser neglects this duty and does not perform post-processing, there arises a problem in that inaccurate information remains in the database to be provided to AR service users.

Accordingly, to update this information in real-time and provide up-to-date information to service users may incur additional management costs for the service provider.

In addition, a method of using services through AR has another disadvantage of it being difficult to accurately recognize an object when a density of devices around a user is high, or when objects overlap along the user's line of sight.

SUMMARY

Accordingly, example embodiments of the present invention are provided to substantially obviate one or more problems due to limitations and disadvantages of the related art.

Example embodiments of the present invention provide a user terminal for providing augmented reality (AR) services.

Example embodiments of the present invention also provide an access point (AP) for collecting AR-related information from a terminal and providing the collected information to peripheral terminals.

Example embodiments of the present invention also provide a method for providing AR services in a user terminal.

In some example embodiments, a user terminal for providing augmented reality (AR) services includes: a reception unit that receives AR-related information broadcast by at least one access point (AP); a photographing unit that photographs an image of an object to obtain the photographed image; and a comparison unit that compares the obtained image of the object with the AR-related information received from the at least one AP to identify the object.

Here, the user terminal may further include a control unit that stores the AR-related information output by the reception unit in a database and manages the stored information.

Also, the user terminal may further include a transmission unit that transmits the photographed image of the object and object-related information to the AP. In addition, the object-related information may include at least one of a name of the object, an identification number of the object, an object-related URL, and coordinates of a place where the image of the object was photographed.

Also, the user terminal may further include an output unit that visualizes and outputs additional information about the identified object.

Also, the comparison unit may extract image characteristics from the photographed image of the object, calculate similarity between the photographed image of the object and at least one image stored in the database based on the extracted image characteristics, and specify the object according to an image having the highest similarity.

Also, the control unit may control communication between the identified object and the user terminal.

Also, the reception unit may receive the AR-related information from the at least one AP in a pre-association state with the at least one AP.

Also, the AR-related information may include an image and additional information with respect to at least one object.

Also, the transmission unit may transmit a photographed image with respect to at least one object and object-related information to the AP in a pre-association state with the at least one AP.

Also, the control unit may apply, to the photographed image of the object, at least one of a photographic point of the object, an auto focusing function, and a cutting function on a touch screen in accordance with a type of the object for the purpose of separating the object from a peripheral background, and provide an application result value to the comparison unit and control the provided application result value to be used for calculating similarity between the photographed image of the object and at least one image stored in the database.

In other example embodiments, an access point includes: a reception unit that receives a photographed image and related information with respect to at least one object from at least one terminal in a pre-association state; a registration unit that registers a photographed image and related information with respect to the at least one object in a database; and a transmission unit that broadcasts the photographed image and related information with respect to the at least one object.

Here, the access point may further include a control unit that performs scheduling on the photographed image and related information with respect to the at least one object while considering at least one of priority between the photographed image and related information with respect to the at least one object, an amount of data stored in the database, and a network condition, and controls the transmission unit to broadcast the photographed image and related information with respect to the at least one object in accordance with the scheduling.

Also, the control unit may broadcast, to the at least one terminal in the pre-association state, the photographed image and related information with respect to the at least one object using at least one frame of a beacon frame, a probe request frame, a service discovery request frame, and a public action frame.

In still other example embodiments, a method for providing AR services in a user terminal includes: receiving AR-related information broadcast by at least one AP in a pre-association state and storing the received information in a database; photographing an image of an object to obtain the photographed image; and comparing the obtained image of the object with the AR-related information received from the at least one AP to identify the object Here, the method may further include visualizing and outputting additional information about the identified object Also, the comparing may include extracting image characteristics from a photographed image of the object, calculating similarity between the photographed image of the object and at least one image stored in the database based on the extracted image characteristics, and specifying the object according to an image with the highest similarity with the photographed image based on a result of the similarity calculation.

BRIEF DESCRIPTION OF DRAWINGS

These and other features and advantages of the present invention will become more apparent by describing in detail example embodiments of the present invention with reference to the accompanying drawings, in which.

DESCRIPTION OF EXAMPLE EMBODIMENTS

Figure 1:
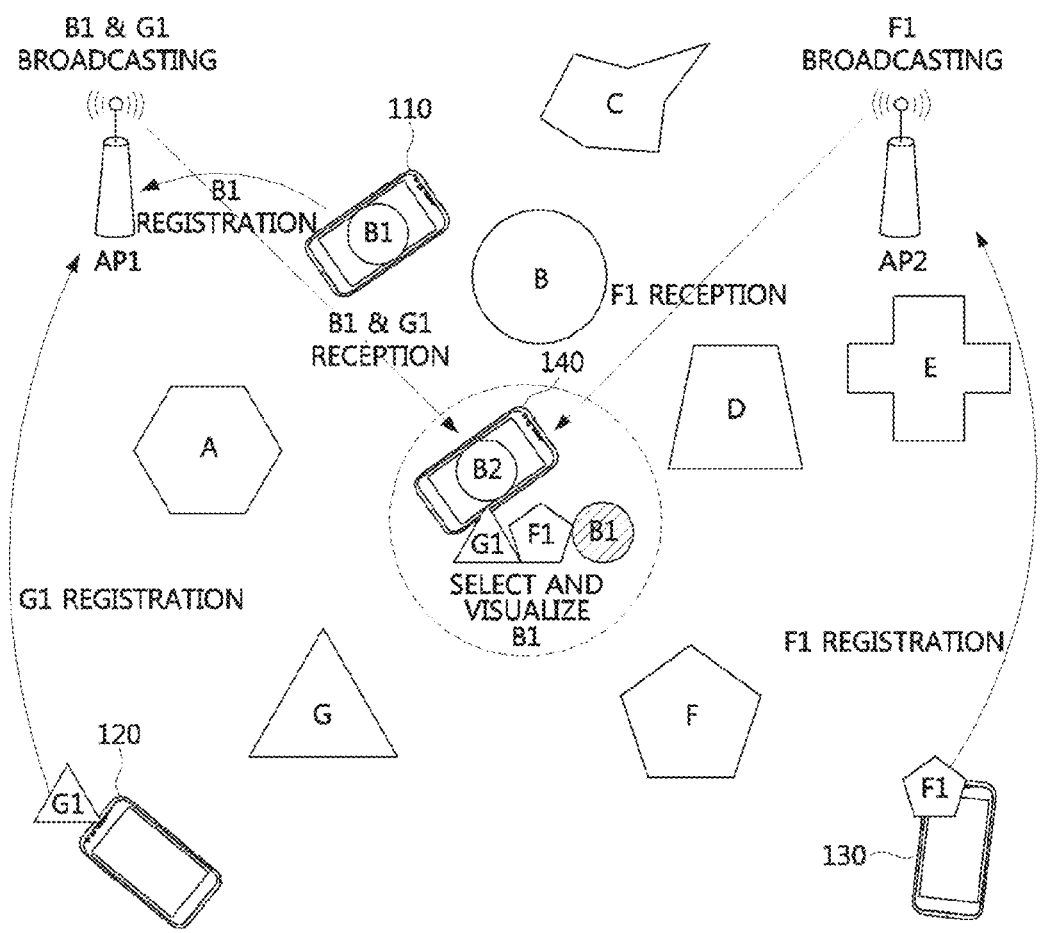
FIG. 1 is a conceptual diagram showing a service concept according to an embodiment of the present invention.

Example embodiments of the present invention are disclosed herein. However, specific structural and functional details disclosed herein are merely representative for purposes of describing example embodiments of the present invention, however, example embodiments of the present invention may be embodied in many alternate forms and to should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

"Terminal" may be used in the present specification in reference to a mobile station (MS), user equipment (UE), a user terminal (UT), a wireless terminal, an access terminal (AT), a terminal, a subscriber unit, a subscriber station, a wireless device, a wireless transmission/reception unit (WTRU), a mobile node, a mobile, or other devices.

A variety of examples of a terminal may include a cellular phone, a smart phone having a wireless communication function, a personal digital assistant (PDA) having a wireless communication function, a wireless modem, a portable computer having a wireless communication function, a photographing device such as a digital camera having a wireless communication function, a gaming device having a wireless communication function, music storage and playback appliances having a communication function, Internet appliances enabling wireless Internet access and browsing, and portable units or terminals in which combinations of the these functions are integrated, but are not limited thereto.

"Access point" or "AP" used in the present specification is a fixed or moving point that generally performs communication with a terminal, may be connected to a plurality of terminals, and is used to collectively call devices that can connect the connected terminals to an Internet network or a communication network.

In the present invention, there is disclosed a method in which peripheral objects may be easily recognized without the help of a service provider through Internet network connection using a camera and a direct communication module which are mounted in a user terminal, communication connection may be performed, and then services may be provided.

In direct communication technologies between general terminals (or between devices), in order to transmit and receive contents by performing connection with peripheral devices, device search, service search, device pairing, security and access authority inspection, IP allocation, and the like should be performed.

As an example in which the direct communication between terminals is effectively used, services using a local media server for providing a large amount of data to visitors who attended concerts or the like may be given.

On the contrary, in the present invention, in a device or service search step performed before network connection in which communication identifiers such as IP addresses are allocated, a method of intuitively selecting a communication object through functions of receiving image information and comparing currently photographed images and the received image information is disclosed. A mobile user terminal may obtain a basic communication identifier or additional information of the selected peripheral devices.

With reference to the appended drawings, exemplary embodiments of the present invention will be described in detail below. To aid in understanding the present invention, like reference numerals refer to like elements throughout the description of the figures, and descriptions of the same elements will be not reiterated.

FIG. 1 is a conceptual diagram showing a service concept according to an embodiment of the present invention.

According to an embodiment of the present invention, access points (APs) AP1 and AP2 may collect images and related information A1 to G1 with respect to peripheral objects A to G from a variety of peripheral user terminals 110, 120, and 130, and broadcast information including previously collected images to peripheral user terminals capable of receiving wireless LAN signals. Here, a mobile terminal and the AP are not in a pre-association state that is different from a mutually connected state.

The user terminals 110, 120, and 130 may receive images of broadcast peripheral objects and related information to store and manage the received information, and compare images obtained by their own cameras with the collected images. Based on the comparison result, an image with the highest matching rate with a peripheral object may be recognized as the peripheral object, and additional information associated with a corresponding image may be displayed as augmented reality (AR) graphics of the user terminal or communication identifier information available in other communication methods may be provided.

In this process, the user terminal may provide image information of the peripheral object, and attempt to connect with an AP to receive the additional information associated with the image information. The user terminal may search APs in the surrounding area for this, and then preferentially access an AP having excellent signal intensity. In this instance, a protocol that is used for communication between the AP and the terminal follows the IEEE 802.11 standard. IEEE 802.11 is technology designed to complement drawbacks of a wired local area network (LAN) type Ethernet, and is located at a distal end of an Ethernet network to be widely used for minimizing unnecessary wiring work and maintenance costs. A single hotspot is installed in a wide area (for example, one office) that is not closed, between an external wide area network (WAN) and a backbone switch, and computers in surrounding offices are wirelessly connected to the hotspot through an Ethernet network, so no cable needs to be installed in the office and no maintenance is required.

In this regard, an initial connection setting process of a station (for example, a mobile terminal) according to 802.11 may be performed when the station is powered on or enters a basic service set (BSS) area. For this process, the station should obtain synchronization information from an AP by performing passive or active scanning on all channels.

In the case of a passive AP scanning, the station may scan physical channels each having a different frequency, select an appropriate AP using information of a beacon frame periodically transmitted from the AP, and then attempt a connection request.

In the case of the passive AP scanning, the station may perform scanning for each channel in a physical layer to compare beacon frames of APs, and then select the best AP based on signal intensities of the beacon frames to transmit a connection setting request message. Next, when a connection response message is received from the AP, a channel is connected.

In the case of an active AP scanning, an initial connection setting procedure is performed in such a manner that the station transmits a probe request message to other physical channels each having a different frequency, and scans probe response messages received from the AP in response to the probe request message to select an appropriate AP, and then attempts a connection request together with an ACK message.

However, in a method for providing augmented reality (AR) according to an embodiment of the present invention, AR services may be provided using information transmitted and received between a user terminal and an AP in a state in which network layer connection between the user terminal and the AP has not been made yet, as well as a state in which connection between the user terminal and the AP has been made.

As a wireless LAN (WLAN) frame that can be used in the state in which the network layer connection between the user terminal and the AP has not been made, a beacon frame, a probe request frame, a service discovery request frame, a public action frame, and the like may be used.

A concept of AR services of a user participation type using direct communication will be described with reference to FIG. 1.

Each of the AP1 and AP2 of FIG. 1 denotes an access point (AP), and mobile terminals 1 to 4 (110 to 140) capable of performing an AR function are located around the AP 1 and the AP 2. A, B, C, D, E, F, and G are objects to be recognized, and are located sporadically around the mobile terminals.

The terminal 1 (110) photographs an object B to be recognized using a built-in camera in a place where many users are likely to use AR services. The terminal 1 (100) generates an image B1 through photography to add information associated with the object B, and then transmits a registration request to a server having a database in which the AP1 refers to created B related-information for broadcasting.

In this instance, the terminal 1 may be in a state (that is, a pre-association state) in which connection with the AP1 has not been made, or in a state (that is, a post-association state) in which the terminal 1 participates in a wireless network established by the AP1.

The AP1 may broadcast its own AR information or AR information stored in the database using a WLAN module through appropriate scheduling.

Meanwhile, the terminal 2 (120) generates an image G1 obtained by photographing an object G and requests registration of the image G1 from the AP1. In the same manner, the terminal 3 (130) also generates AR information to request registration of the generated AR information from the AP2 positioned nearer than the AP1.

The AP1 and AP2 may perform appropriate scheduling based on an amount of their own AR object information and a condition of a network, and perform broadcasting in a method in which peripheral WLAN devices all receive information. For this, as a WLAN frame that can be used in a pre-association state, a beacon frame defined in 802.11-2012, a probe request frame, a service discovery request frame, a public action frame, and the like may be used.

The AP1 may broadcast B1-related AR information and G1-related AR information, and the AP2 may broadcast F1-related AR information. The terminal 4 (140) in a pre-association state which reaches a typical position where the object B is viewed by the terminal 4 (140) may receive the G1-related AR information together with B1-related AR information broadcast by the AP1. The terminal 4 (140) may also receive F1 broadcast by the AP2.

The terminal 4 (140) that has received B1, G1, and F1 may select image B1 that is most similar to image B2 obtained by photographing B as an object of interest, and visualize related information transmitted with the image B1 together with a camera image to visually provide the information to a user. The user may search the Internet using the related information or perform communication with an object specified by an identifier through an available communication method.

Figure 2:
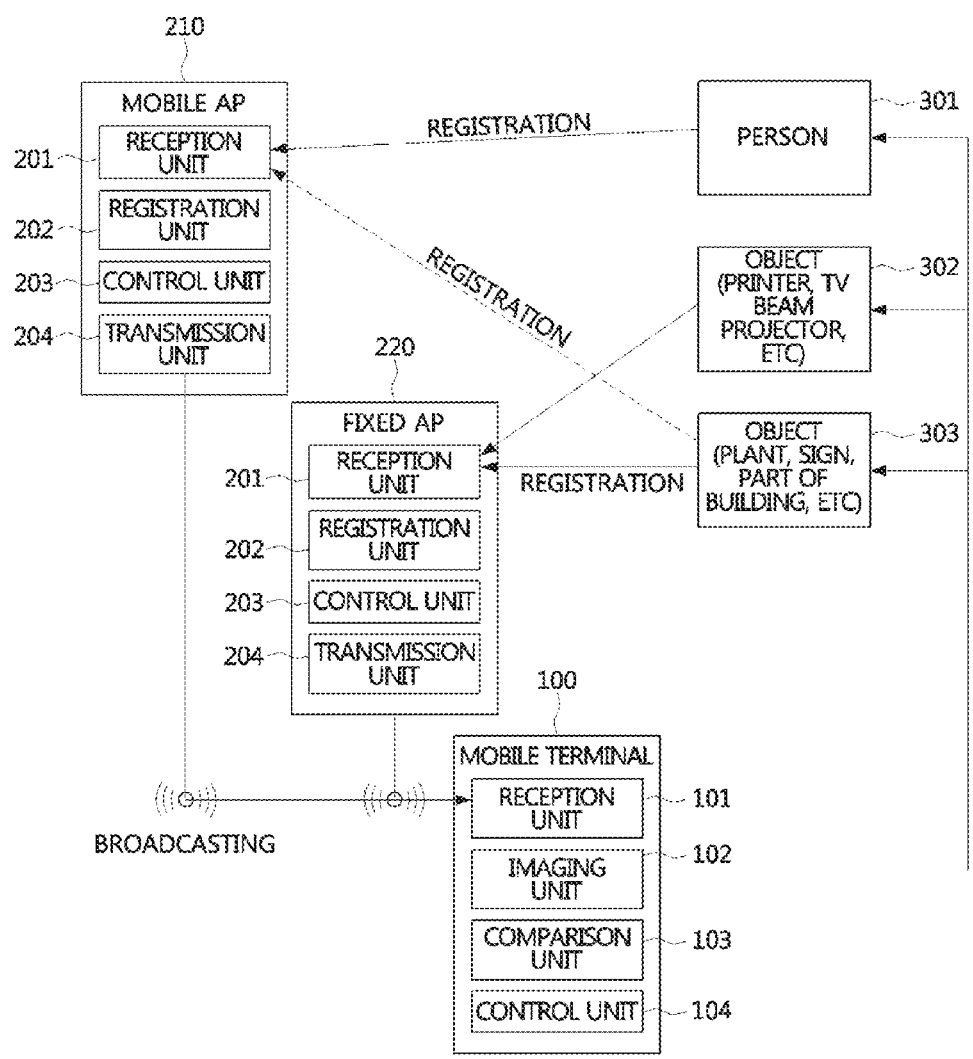
FIG. 2 is a configuration diagram showing a system for providing augmented reality (AR) services of a user participation type according to an embodiment of the present invention.

FIG. 2 is a configuration diagram showing a system for providing augmented reality (AR) services of a user participation type according to an embodiment of the present invention.

FIG. 2 shows an embodiment of the overall configuration of the present invention that includes a mobile terminal having image reception and image comparison functions, a mobile AP or fixed AP having image transmission and image registration functions, and peripheral objects.

In the present invention, objects desired to be recognized through a mobile AP 210 or a fixed AP 220 may be classified into a person 301 and objects 302 and 303, and these objects may be registered in the fixed AP and the mobile AP through a user's voluntary participation.

Information including the registered image may be transmitted to a periphery by a wireless communication module of the fixed AP or the mobile AP in the form of broadcasting.

The mobile terminal 100 within a wireless coverage range may receive the broadcast and collect information including images and the like through the reception unit 101 of the wireless communication module in a pre-association state. A mobile user may photograph peripheral objects through a camera module 120 mounted in a terminal to obtain images, and compare the obtained images with image information that has been previously collected from the mobile AP or the fixed AP to obtain additional information on the object desired by a communication target or a user.

More specifically, each of the mobile AP 210 and the fixed AP 220 may include a reception unit 201, a registration unit 202, a control unit 203, and a transmission unit 204.

The reception unit 201 may receive a photographed image and related information with respect to at least one object from at least one terminal in a pre-association state.

The registration unit 202 may register the received photographed image and related information with respect to the at least one object in a database, and the transmission unit 204 may broadcast the photographed image and related information with respect to the at least one object. In this instance, the transmission unit may broadcast augmented reality (AR)-related images and additional information to terminals in a state in which network layer connection between the transmission unit and an AP has not been made yet.

The control unit 203 may perform scheduling on the photographed image and related information with respect to the at least one object, based on at least one of priority between the photographed image and related information with respect to the at least one object, an amount of data stored in a database, and a network condition, and control the transmission unit 204 to transmit information in accordance with the scheduling.

As a frame that can be used when the control unit 203 broadcasts the photographed image and related information with respect to the at least one object to the at least one terminal in a pre-association state, a beacon frame, a probe request frame, a service discovery request frame, a public action frame, and the like may be used.

In this manner, through the configuration according to the present invention, wire-based legacy devices may also register images in an AP, and the fixed AP on behalf of the legacy devices may broadcast an image of a corresponding legacy device to at least one user terminal which is in a pre-association state with the AP.

For this, it is necessary that the mobile AP 210 and the fixed AP 220 store images capable of identifying themselves or peripheral devices in advance. As an example, as images that can represent the mobile terminal, images such as a smart phone, a web pad, a notebook, and the like may be stored. The fixed AP may store images such as a printer, a television (TV), and the like, which only have a wired communication function, and may also store images with respect to peripheral objects which do not have a communication function. The fixed AP may perform active image update so as to additionally register objects. In order to increase a recognition rate of the images registered in the fixed AP, typical position information may be utilized.

Meanwhile, the mobile terminal 100 may include a reception unit 101, an imaging unit 102, a comparison unit 103, and a control unit 104.

The reception unit 101 may receive AR-related information that is broadcast by at least one AP. That is, the reception unit 101 may receive image-related characteristic information that is broadcast by a mobile AP or a fixed AP in a pre-association state between a user terminal and an AP. Here, AR-related information may include images and related additional information with respect to at least one object.

The imaging unit 102 may acquire a mobile user or images of peripheral objects by photographing a communication object (subject).

The comparison unit 103 may compare the acquired image of the object with AR-related information received from the AP to identify the object, and classify a desired communication object of the mobile user to provide the classified communication object to the control unit 104. Here, the comparison unit 103 may extract image characteristics from the photographed image of the object, calculate similarity between the photographed image of the object and at least one image stored in the database based on the extracted image characteristics, and specify the object according to an image with the highest similarity.

The control unit 104 may store and manage the image-related characteristic information received by the reception unit 101, and may control communication between the identified object and the user terminal when a user desires to perform communication with the identified object.

The control unit 104 may update a memory of the mobile terminal by a scheduling policy based on time, a reception period, repeatability of information, and the like, according to information received from a mobile AP that has a high density of peripheral devices or moves away from a periphery of a user.

Here, a method of scheduling that updates the memory is not limited to any specific method, and may include overall management functions such as changing the memory or a storage by deleting unnecessary information or additionally acquiring required information.

Meanwhile, the user terminal may further include a transmission unit (not shown) that transmits the photographed image with respect to the object and at least one of object-related information to the AP in order to register AR data in the AP.

In addition, the user terminal may further include an output unit (not shown) that visualizes and outputs additional information with respect to the identified object.

Figure 3:
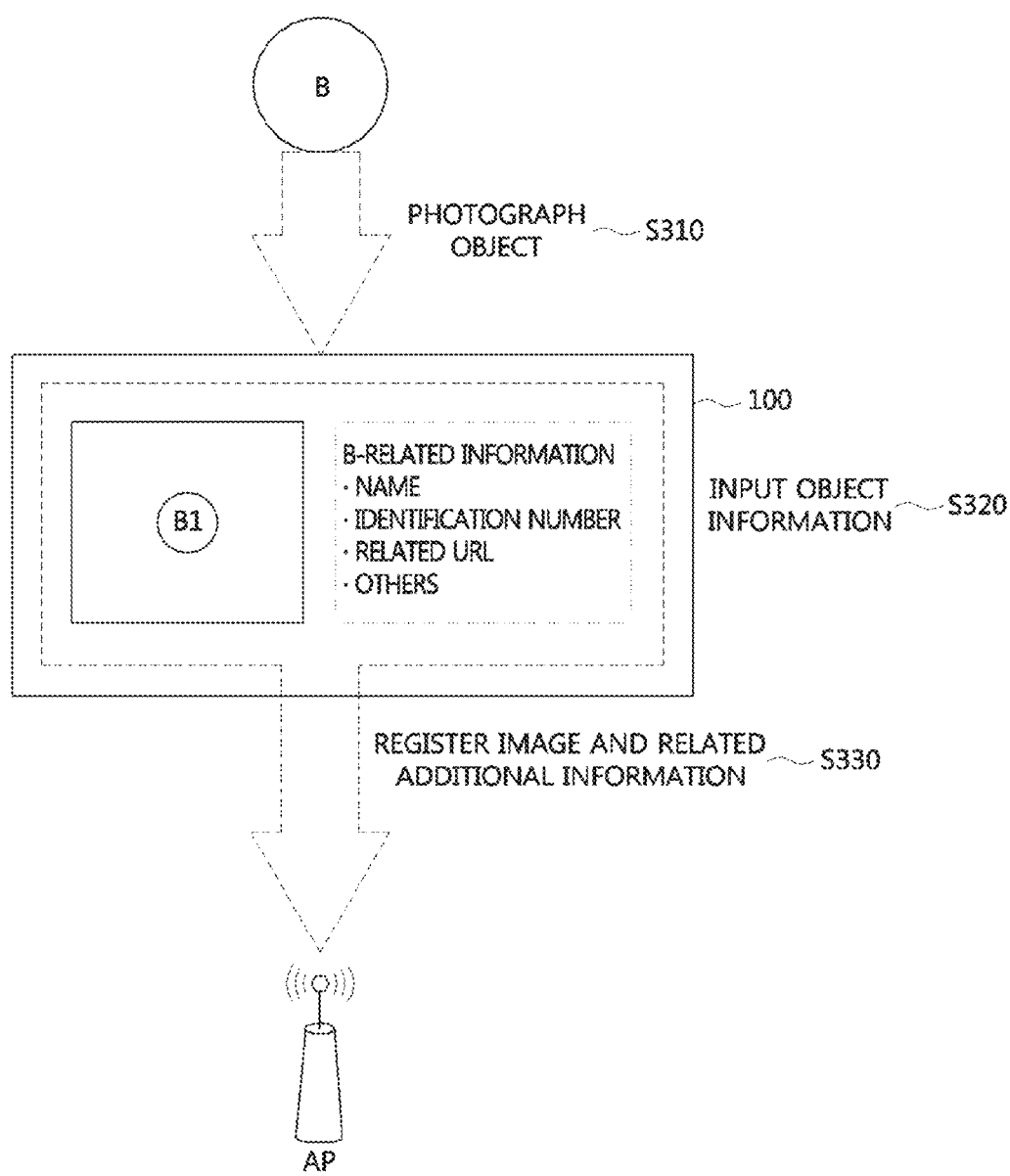
FIG. 3 is a conceptual diagram showing a method for collecting AR-related information according to an embodiment of the present invention.

FIG. 3 is a conceptual diagram showing a method for collecting AR-related information according to an embodiment of the present invention.

In order to collect image information about peripheral objects in the mobile user terminal, related database has to be established in the mobile AP or the fixed AP in advance.

In the present invention, in a process of establishing such a database, the mobile user may photograph peripheral objects and directly register the photographed objects.

FIG. 3 illustrates a screen in which the mobile terminal including a camera mounted therein generates an image B1 obtained by photographing an object B, and then object B-related additional information is received from a user.

In operation S310, a user photographs the object B in a place where the object B is highly visible, or an easily specified place such as front of the object. These places are preferably where other users are likely to use AR services. This method is a method of a participation type, and may increase the probability that AR services with high accuracy are provided.

In operation S320, the user inputs the image B1 and information associated with the object B that the user himself of herself knows. An object to be photographed may be office supplies such as a printer in an office, or a storefront on the boulevard. In the case of the printer, information for setting the printer or URL capable of ordering printer supplies may be printer-related additional information. In the case of the store, an online order system or a menu may be store-related additional information.

Next, in operation S330, the mobile terminal 100 transmits the object-related additional information and the image B1 to an AP, and requests the AP to provide services for AR terminals which are nearby or will be nearby in the future.

Here, the mobile terminal 100 may transmit, to the AP, information included in a beacon frame defined in 802.11-2012, a probe request frame, a service discovery request frame, and a public action frame, or participate in a wireless network provided by the AP to request registration using a web provided by the AP or other application protocols.

The individual mobile AP or the fixed AP 200 may provide a function of registering a user-defined message and the like, such as an advertisement message, GPS coordinates where pictures are taken, a URL for providing additional information, or the like, in addition to basic information such as a communication ID including images with respect to peripheral objects.

In the present invention, a method in which a communication object may be easily selected by a user shooting videos or pictures while the mobile terminal accesses a peripheral device is provided.

Figure 4:
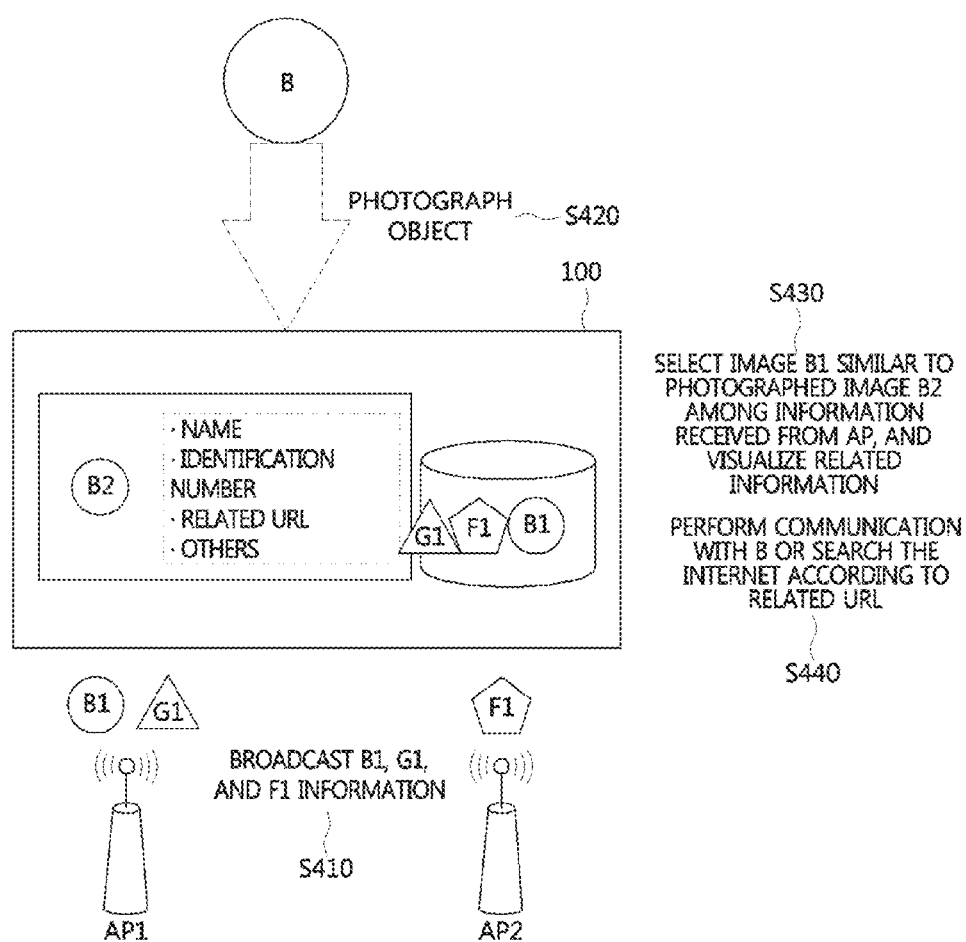
FIG. 4 is a conceptual diagram showing a method for representing AR-related images according to another embodiment of the present invention.

FIG. 4 is a conceptual diagram showing a method for representing AR-related images according to another embodiment of the present invention.

Specifically, FIG. 4 is a diagram showing a process of comparing information previously collected and a photographed image, and a process of reporting that a communication object has been selected by image similarity, which are performed by a mobile terminal.

In operation S410, the mobile terminal 100 using AR services receives AR information associated with B1, G1, and F1 which are transmitted by the AP1 and the AP2 in a pre-association state, and stores the received information in a database.

In operation S420, the mobile terminal 100 photographs an actual object B when a terminal user requests information about the object B through AR services, and compares the photographed image B2 with images including B1, G1, and F1 to select the most similar image B1 to the image B2.

In operation S430, the mobile terminal visualizes and displays information associated with the selected image B1 on a screen of an AR application program.

Next, in operation S440, when the object B is another terminal based on the provided AR information, the user may select an additional operation such as attempting to perform communication with the object B or performing the Internet search by selecting a URL associated with the object B.

Here, according to an embodiment of the present invention, in a pre-association state in which network layer connection between the mobile terminal and peripheral devices has not been made yet, the mobile terminal may apply a photographic point, an auto focusing function, and a cutting function on a touch screen in accordance with a type of the object for the purpose of separating the object from a peripheral background.

In this manner, according to an embodiment of the present invention, before connection in a network layer between the mobile terminal and peripheral APs (the mobile AP or the fixed AP) is made, that is, in the pre-association state, the mobile terminal may receive image information from the AP in advance, calculate similarity of an image currently photographed by a camera, and allow connection to the peripheral device with the highest similarity or display additional information about the peripheral device.

For this, the AP is required to have image information representing the AP itself or peripheral objects in advance. According to an embodiment of the present invention, peripheral objects which do not have a communication function may also be registered in the AP through user participation, that is, a user's terminal, and presence of the registered peripheral objects may be broadcast to peripheral devices through the AP.

Figure 5:
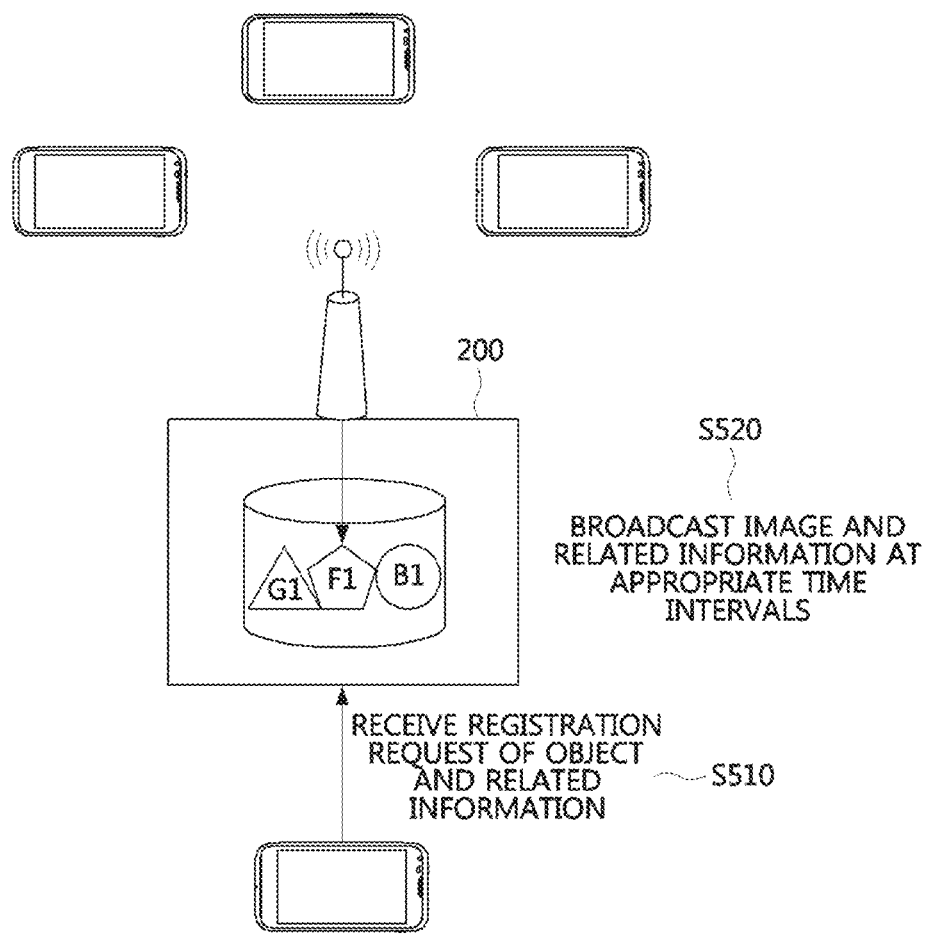
FIG. 5 is an operational conceptual diagram of an access point (AP) for providing AR information.

FIG. 5 is an operational conceptual diagram of an access point (AP) for providing AR information.

When an image of an object and related additional information are registered in the AP by a request from at least one terminal in operation S510, the AP broadcasts the registered information at appropriate time intervals in operation S520.

As for scheduling among G1, F1, and B1 when performing broadcasting, a variety of methods of scheduling may be used in accordance with which wireless frame is used with AR data.

The AP ascertains a current traffic situation of a wireless network near the AP itself, and transmits AR data at appropriate intervals.

The AP may cyclically transmit G1, F1, and B1 AR data, and adjust a re-transmission interval in accordance with characteristics that change depending on the contents. For example, the AP performs re-transmission with respect to urgent or important information in a shorter period.

As described above, at least one mobile terminal that has received AR-related information from the AP 200 stores and keeps broadcast AR data, compares the AR data with an object requested by a user, and provides an appropriate image to the user.

Figure 6:
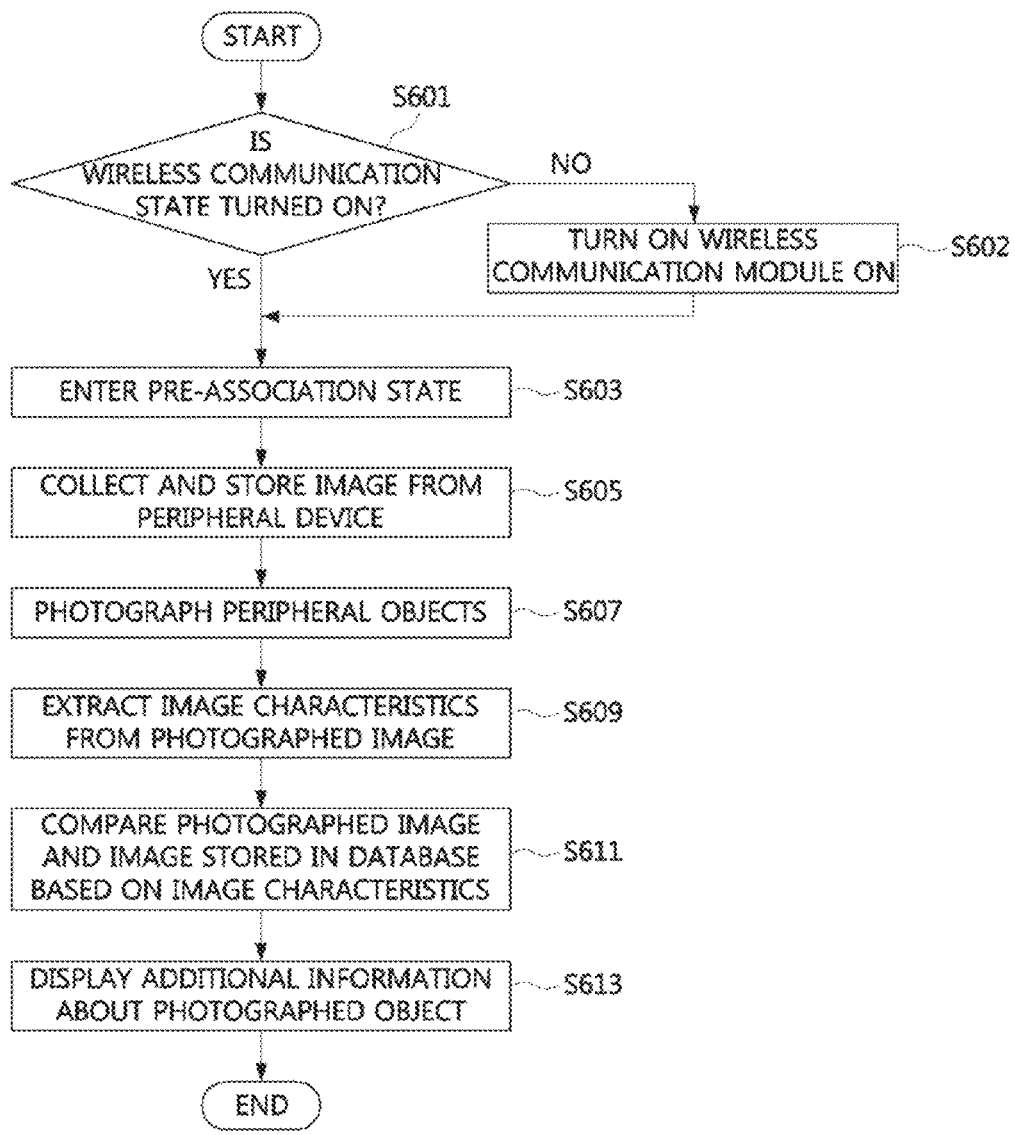
FIG. 6 is an operational flowchart showing a user terminal according to an embodiment of the present invention.

FIG. 6 is an operational flowchart showing a user terminal according to an embodiment of the present invention.

As shown in FIG. 6, in the operational flowchart of the user terminal that provides AR services, a mobile terminal may receive AR-related information from an AP, and recognize an object using an AR application.

Specifically, in operation S601, the mobile terminal determines whether a wireless communication state is turned on.

In operation S602, when the wireless communication state is not turned on, an operation of a wireless communication module starts.

Next, in operation S603, the mobile terminal enters a pre-association state.

In operation S605, in this state, the mobile terminal collects images from peripheral devices and stores the collected images in a database that the mobile terminal itself has.

Here, as a representative example of the peripheral device, a fixed AP and a mobile AP may be given, but the present invention is not limited thereto, and another mobile terminal which performs direct communication with a corresponding mobile terminal may be used.

Here, when the peripheral device is the other mobile terminal, the other mobile terminal may be operated as the above-described mobile AP. That is, the mobile terminal may be operated as an AP according to an embodiment of the present invention that performs the above-described collection of the images and broadcasting, and perform transmission and reception operations using direct communication with the other terminal that receives the broadcast images and related information.

Next, in operation S607, peripheral objects of interest to a user of the mobile terminal are photographed.

In operation S609, image characteristics are extracted from the photographed images of the object.

In operation S611, the photographed images and images stored in a database are compared based on the extracted image characteristics to identify the object.

In operation S613, a user terminal additionally displays additional information about a corresponding object to provide the displayed information to a user.

Figure 7:
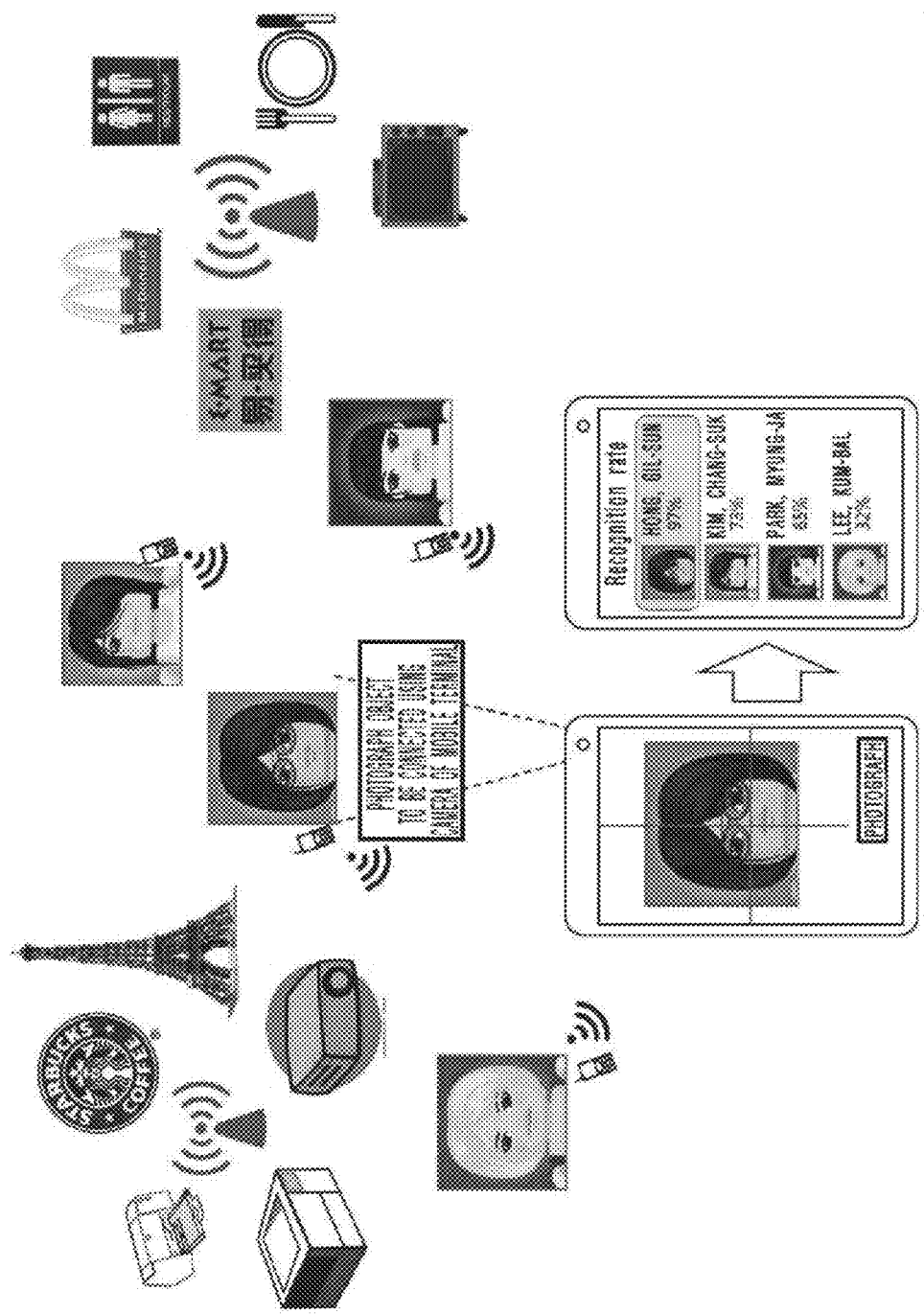
FIG. 7 is a diagram showing a representative use example of AR providing services according to an embodiment of the present invention.

FIG. 7 is a diagram showing a representative use example of AR providing services according to an embodiment of the present invention.

FIG. 7 shows an application example in which image similarity about image-based peripheral objects which are previously collected is calculated in a pre-association state from images obtained by photographing faces of bystanders utilizing a camera module of a smart phone, and the images are output on a mobile screen in order of descending priority.

However, the present invention is not limited to the embodiment shown in FIG. 7, and includes a variety of applications in which image information is received in a pre-association state in which connection in a network layer has not been made yet, and the received image information and images obtained by photographing objects currently viewed by a user are compared.

As described above, according to the embodiments of the present invention, even when an object or a person desired to be recognized does not have a communication function, information about the object may be obtained using only information of the database stored in the AP.

According to the above-described configuration of the present invention, a user can perform direct connection to a peripheral device having a communication function by an intuitive method of photographing videos or images by utilizing a camera of a mobile device such as a smart phone or a web pad and a communication function, and can obtain additional information even about an object that does not have a communication function.

According to the embodiments of the present invention, additional information may be provided to the object that does not have a communication function, through images registered in a mobile AP or a fixed AP, and therefore it is possible to provide AR services to peripheral devices of the user without depending on a specific server.

While the example embodiments of the present invention and their advantages have been described in detail, it should be understood that various changes, substitutions and alterations may be made herein without departing from the scope of the invention.

What is claimed is:

1. A user terminal for providing augmented reality services, the user terminal comprising:
   a reception unit that receives augmented reality related information through a local area network from at least one access point, wherein the at least one access point connects reception units to a communication network;
   a photographing unit that photographs an image of an object to obtain a photographed image;
   a comparison unit that compares the obtained image of the object with the augmented reality related information received from the at least one access point to identify the object; and
   a transmission unit that transmits the photographed image of the object and object-related information to the access point,
   wherein the reception unit receives the augmented reality related information from the at least one access point in a pre-association state with the at least one access point,
   wherein the pre-association state is a state in which a network layer connection between the user terminal and the at least one access point has not been made,
   wherein the transmission unit transmits the photographed image with respect to at least one object and object-related information to the access point in the pre-association state with the at least one access point, and
   wherein the augmented reality related information includes an image and additional information with respect to at least one object.

2. The user terminal of claim 1, further comprising:
   a control unit that stores the augmented reality related information output by the reception unit in a database and manages the stored information.

3. The user terminal of claim 1,
wherein the object-related information includes at least one of a name of the object, an identification number of the object, an object-related URL, and coordinates of a place where the image of the object was photographed.

4. The user terminal of claim 1, further comprising:
an output unit that visualizes and outputs additional information about the identified object.

5. The user terminal of claim 1, wherein the comparison unit extracts image characteristics from the photographed image of the object, calculates similarity between the photographed image of the object and at least one image stored in the database based on the extracted image characteristics, and specifies the object according to an image having the highest similarity.

6. The user terminal of claim 2, wherein the control unit controls communication between the identified object and the user terminal.

7. The user terminal of claim 2, wherein the control unit applies, to the photographed image of the object, at least one of a photographic point of the object, an auto focusing function, and a cutting function on a touch screen in accordance with a type of the object so as to separate the object from a peripheral background, and provides an application result value to the comparison unit and controls the provided application result value to be used for calculating similarity between the photographed image of the object and at least one image stored in the database.

8. An access point comprising:
a reception unit that receives a photographed image and related information with regard to at least one object through a local area network from at least one terminal in a pre-association state with the access point, wherein the access point connects reception units of the at least one terminal to a communication network;
a registration unit that registers the photographed image and the related information with regard to the at least one object in a database; and
a transmission unit that broadcasts the photographed image and the related information with respect to the at least one object,
wherein the pre-association state is a state in which a network layer connection between the at least one terminal and the access point has not been made.

9. The access point of claim 8, further comprising:
a control unit that performs scheduling on the photographed image and the related information with respect to the at least one object while considering at least one of priority between the photographed image and the related information with respect to the at least one object, an amount of data stored in the database, and a network condition, and controls the transmission unit to broadcast the photographed image and the related information with respect to the at least one object in accordance with the scheduling.

10. The access point of claim 9, wherein the control unit broadcasts, to the at least one terminal in the pre-association state, the photographed image and the related information with respect to the at least one object using at least one of a beacon frame, a probe request frame, a service discovery request frame, and a public action frame.

11. The access point of claim 8, wherein the access point is a mobile access point or a fixed access point.

12. The access point of claim 8, wherein the related information with respect to the at least one object includes at least one of a name of the object, an identification number of the object, an object-related URL, and coordinates of a place where an image of the object was photographed.

13. A method for providing augmented reality services in a user terminal, the method comprising:
receiving augmented reality related information through a local area network from at least one access point in a pre-association state and storing the received information in a database, wherein the at least one access point connects reception units to a communication network;
photographing an image of an object to obtain a photographed image;
comparing the obtained image of the object with the augmented reality related information received from the at least one access point to identify the object; and
transmitting the photographed image of the object and object-related information to the access point,
wherein the pre-association state is a state in which a network layer connection between the user terminal and the at least one access point has not been made,
wherein the photographed image with respect to at least one object and object-related information is transmitted to the access point in the pre-association state with the at least one access point, and
wherein the augmented reality related information includes an image and additional information with respect to at least one object.

14. The method of claim 13, further comprising:
visualizing and outputting additional information about the identified object.

15. The method of claim 13, wherein the comparing the obtained image of the object with the augmented reality related information received from the at least one access point to identify the object includes:
extracting image characteristics from the photographed image of the object,
calculating similarity between the photographed image of the object and at least one image stored in the database based on the extracted image characteristics, and
specifying the object according to an image with the highest similarity with the photographed image based on a result of the similarity calculation.

* * * * *